United States Patent Office 3,756,790
Patented Sept. 4, 1973

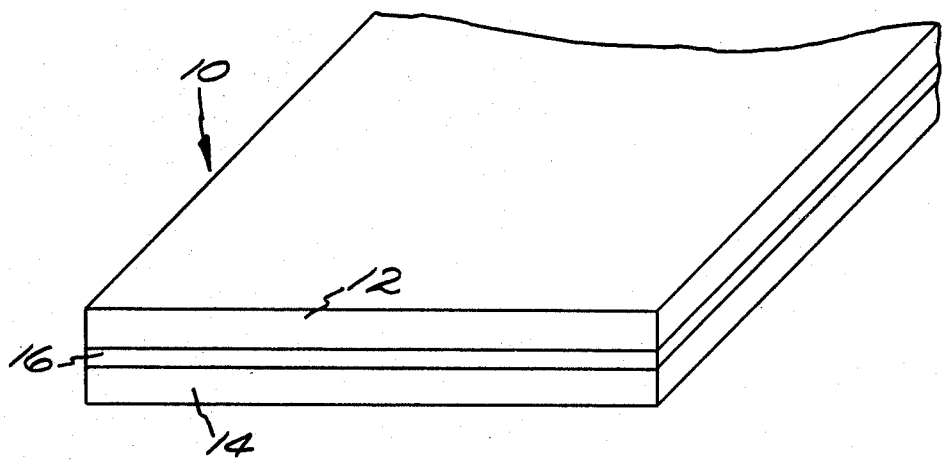

3,756,790
COMPOSITE THERMOSTAT MATERIAL
Jacob L. Ornstein, Norton, Mass., assignor to Texas Instruments Incorporated, Dallas, Tex.
Filed Nov. 22, 1971, Ser. No. 200,741
Int. Cl. B32b *15/00*
U.S. Cl. 29—195.5
2 Claims

ABSTRACT OF THE DISCLOSURE

An improved multilayer composite thermostat material is disclosed having predetermined characteristics of electrical resistivity and flexivity, including first and second outer layers of preselected metallic alloys having relatively high and relatively lower coefficients of thermal expansion respectively, and an intermediate layer of a third preselected metallic material of a substantially nickel-free, non-ferrous copper alloy. The composite material may have a resistivity of between approximately 100 ohms per circular mil foot to 400 ohms per circular mil foot and a flexivity of between approximately $100 \times 10^{-7}$ to $160 \times 10^{-7}$ inch per inch per degree Fahrenheit.

---

The present invention relates generally to thermostat materials and more particularly is directed to an improved composite thermostat material.

A wide variety of composite thermostat materials are presently available, comprising bimetal structures including layers of metallic alloys suitably bonded to each other with one of the layers having a relatively high coefficient of thermal expansion and the other layer having a relatively lower coefficient of thermal expansion in order to achieve desired characteristics of resistivity and flexivity, permitting the use of the material in a desired application such that deflection of the thermostat material may occur in response to temperature variations in the manner known to those skilled in the art. The thermostat material may be used in a variety of different applications such as in temperature over-protection applications, in circuit breakers, etc. Particularly when utilized in circuit breaker applications certain resistivity ratings may be required for proper operation as well as a relatively high flexivity rating, so that a suitable thermal activity results. Accordingly, in situations in which a relatively high resistivity rating is desired, i.e. in the range of 100 to 400 ohms per circular mil foot, composite thermostat materials have been developed in which an intermediate shunt layer is provided secured between the high expansion coefficient and lower expansion coefficient materials in order to accomplish variation in the resistivity characteristics of the composite, while retaining a useful flexivity rating.

Typically, the intermediate shunt layer comprises substantially pure nickel, which has been found to be particularly useful in such applications. However, this introduces a substantial additional expense and also requires the usage of a relatively scarce material, i.e., nickel. Similarly, in certain instances when a resistivity level at the lower end of the above mentioned range, i.e. between approximately 100 to 200 ohms per circular mil foot, for example, such a composite material may have an inadequate flexivity for certain applications.

Accordingly, it is an object of the present invention to provide an improved multilayer composite thermostat material having desired properties of flexivity, resistivity, etc. in which the usage of relatively scarce materials is substantially minimized.

It is a further object of the present invention to provide an improved composite multilayer thermostat material which is relatively convenient to fabricate and durable in use, and has desired resistivity and flexivity ratings, as well as high strength and good corrosion resistance properties.

Various additional objects and advantages of the present invention will become readily apparent from the following detailed description and accompanying drawing wherein:

The sole drawing is a perspective view of the composite thermostat material of the present invention.

Referring in detail to the drawing, a strip of composite thermostat material in accordance with the principles of the present invention is illustrated and indicated generally by the reference numeral 10. As shown, the composite thermostat material 10 includes a first outer layer 12 of a first preselected metallic alloy having a relatively high coefficient of thermal expansion, a second outer layer 14 of a second preselected metallic alloy having a relatively lower coefficient of thermal expansion than the first preselected material, and an intermediate layer 16 of a third preselected metallic alloy comprising a substantially nickel-free, non-ferrous, copper alloy. The composite thermostat material illustrated preferably has a resistivity of between approximately 100 ohms per circular mil foot to 400 ohms per circular mil foot and a flexivity of between approximately $100 \times 10^{-7}$ to $160 \times 10^{-7}$ inch per inch per degree Fahrenheit. The values of desistivity and flexivity, of course, are dependent upon the particular materials selected for use as the first and second outer layers, as well as the thickness of the intermediate layer 16 relative to that of the first and second outer layers. The first and second outer layers 12, 14 are metallurgically bonded, preferably solid-phase bonded, to the opposed surfaces of the intermediate layer 16, the bonds between the various metallic layers extending substantially throughout the entire contiguous surfaces of the layers defining the composite material 10. Preferably the layers are solid-phase bonded together in the manner described, for example, in U.S. Pats. Nos. 2,691,815 and 2,753,623. If desired, various other bonding techniques may be employed for metallurgically bonding the layers together within the scope of the present invention. The thickness of the composite material 10 may vary from approximately 0.001 to 0.100 inch. The illustrated composite thermostat material 10 comprises an integral unit adapted to flex in response to temperature changes and is suitable for use in a wide variety of applications.

In accordance with an important feature of the present invention the intermediate layer 16 preferably comprises a material which in combination with the first and second outer layers yields a composite material having the above described characteristics of resistivity and flexivity, while the resultant composite has excellent corrosion resistance properties, as well as useful deflection over a substantial temperature range and which permits convenient adjustment of the resistivity and flexivity of the composite material by varying the thickness thereof relative to that of the first and second outer layers. More particularly, the intermediate layer 16 preferably comprises by weight approximately 98.75 percent copper and 1.25 percent tin and is commonly known as Phosphor-bronze E. The intermediate layer 16 may be referred to as a shunt layer since it substantially affects the resistivity, as well as the flexivity of the resultant composite material, in response to variations in its thickness relative to the outer layers 12, 14, thereby facilitating the provision of a composite material having desired characteristics. Furthermore, the use of Phosphor-bronze E as the intermediate layer is advantageous in that the usage of a relatively expensive, scarce material, such as nickel, is avoided. Moreover, a composite thermostat material may be provided, utilizing the Phosphor-bronze E intermediate layer, having improved flexivity over a substantial resistivity range in comparison with the usage of nickel, as an intermediate layer.

The relative thickness of the intermediate layer may vary between approximately 2 percent to 50 percent of the total thickness of the composite material, while the first and second outer layers 12, 14 may be of approximately equal thickness with respect to each other and comprise the remaining thickness of the composite material 10. The resistivity of the Phosphor-bronze E intermediate layer is at least an order of magnitude and may be several orders of magnitude less than the resistivity of the first and second outer layers and, in the illustrated embodiment is approximately 21.5 ohms per circular mil foot. Such a relatively low resistivity is quite advantageous, since it permits adjusting the resistivity of the over-all composite material to a desired level by varying the thickness of the intermediate layer relative to that of the substantially higher resistivity first and second outer layers 12, 14. The resultant composite material preferably has a resistivity of between approximately 100 ohms per circular mil foot to 400 ohms per circular mil foot and a flexivity of between approximately $100 \times 10^{-7}$ to $160 \times 10^{-7}$ inch per inch per degree Fahrenheit over a substantial temperature range of approximately $-100$ degrees Fahrenheit to 800 degrees Fahrenheit.

In selecting suitable materials comprising the first and second outer layers 12, 14 which are respectively of materials having a relatively high coefficient of thermal expansion and a relatively lower coefficient of thermal expansion a relatively wide variety of materials may be selected which are compatible with the Phosphor-bronze E intermediate layer. For example, the first outer layer may comprise a material which comprises by weight approximately 22 percent nickel, 3 percent chromium, and the balance iron commonly known as alloy B which has a thermal coefficient of expansion, of approximately $10.5 \times 10^{-6}$ inch per inch per degree Fahrenheit and a resistivity of approximately 460 ohms per circular mil foot, or a material which comprises by weight approximately 72 percent manganese, 18 percent copper, and 10 perecnt nickel, which is commonly known as alloy P and has a coefficient of thermal expansion of approximately $15.0 \times 10^{-6}$ inch per inch per degree Fahrenheit and a resistivity of 1019 ohms per circular mil foot. The second outer layer 14, similarly may comprise one of several materials and, for example, may comprise a material which comprises by weight approximately 35½ percent to 36½ percent nickel and the balance iron which is commonly known as Invar or alloy 10 and has a coefficient of thermal expansion of approximately $0.7 \times 10^{-6}$ inch per inch per degree Fahrenheit and a resistivity of approximately 484 ohms per circular mil foot. These examples of specific materials comprising the first and second outer layers 12, 14 are purely illustrative and are merely presented as examples of typical, commonly available, relatively inexpensive materials which are suitable for use in fabricating a composite thermostat material in accordance with the present invention.

The materials comprising the various layers, as described hereinabove, are all characterized by good corrosion resistance and ability to withstand substantial elevated temperatures without deleterious effects. In addition, all of the materials have compatible work-hardening properties and the like so that they may be readily secured together by roll-bonding techniques, or the like, with good control of layer thickness in the resulting composite material. As a typical example of the degree of improvement of the flexivity characteristics of a composite thermostat material made in accordance with the principles of the present invention, utilizing an intermediate layer 16 comprising Phosphor-bronze E and first and second outer layers 12, 14 comprising alloy B and alloy 10 respectively, it has been found that by adjusting the relative thicknesses of the layers to achieve a resistivity of approximately 100 ohms per circular mil foot the flexivity of the resultant composite is approximately 27 percent greater than a similar structure fabricated utilizing substantially pure nickel as the intermediate layer, whereas the composite material in accordance with the present invention is substantially less expensive due to the avoidance of the usage of nickel, and, of course, conserves the usage of a relatively scarce material, i.e. nickel. Similarly, by adjusting the relative thicknesses of the layers to achieve a resistivity of approximately 200 ohms per circular mil foot it has been found that the resultant composite material in accordance with the present invention has a flexivity which is approximately 4 percent greater than a similar structure fabricated utilizing nickel as the intermediate layer.

Thus, an improved composite thermostat material has been described in detail hereinabove which may be seen to be characterized by useful properties in terms of flexivity, resistivity, and a substantial reduction in the usage of relatively scarce and/or expensive materials.

Various changes and modifications in the above-described embodiment will be readily apparent to those skilled in the art and any of such changes or modifications are deemed to be within the spirit and scope of the present invention as set forth in the appended claims.

I claim:

1. A composite thermostat material comprising a first outer layer of a first preselected metallic alloy having a relatively high coefficient of thermal expansion, a second outer layer of a second preselected metallic alloy having a relatively lower coefficient of thermal expansion than said first preselected metallic alloy, and an intermediate layer of an alloy consisting essentially of, by weight, approximately 98.75 percent copper and 1.25 percent tin, said intermediate layer having a thickness comprising between approximately 2 percent to 50 percent of the total thickness of said composite material and said first and second outer layers being of approximately equal thickness with respect to each other, being bonded to respective opposite surfaces of said intermediate layer, and comprising the remaining thickness of said composite material, said first preselected metallic alloy consisting essentially of, by weight, approximately 22 percent nickel, 3 percent chromium and the balance iron, and said second preselected metallic alloy consisting essentially of, by weight, approximately 35½ percent to 36½ percent nickel and the balance iron, said composite material having a resistivity of between approximately 100 to 400 ohms per circular mil foot and a flexivity of between approximately $100 \times 10^{-7}$ to $160 \times 10^{-7}$ inch per inch per degree Fahrenheit.

2. A composite thermostat material comprising a first outer layer of a first preselected metallic alloy having a relatively high coefficient of thermal expansion, a second outer layer of a second preselected metallic alloy having a relatively lower coefficient of thermal expansion than said first preselected metallic alloy, and an intermediate layer of an alloy consisting essentially of, by weight, approximately 98.75 percent copper and 1.25 percent tin, said intermediate layer having a thickness comprising between approximately 2 percent to 50 percent of the total thickness of said composite material and said first and second outer layers being of approximately equal thickness with respect to each other, being bonded to respective opposite surfaces of said intermediate layer, and comprising the remaining thickness of said composite material, said first preselected metallic alloy consisting essentially of, by weight, approximately 72 percent manganese, 18 percent copper, and 10 percent nickel, and said second preselected metallic alloy consisting essentially of, by weight, approximately 35½ percent to 36½ percent nickel and the balance iron, said composite material having a resistivity of between approximately 100 to 400 ohms per circular mil foot and a flexivity of between approximately $100 \times 10^{-7}$ to $160 \times 10^{-7}$ inch per inch per degree Fahrenheit.

References Cited
UNITED STATES PATENTS

| | | | |
|---|---|---|---|
| 2,240,824 | 5/1941 | Alban | 29—195.5 |
| 2,327,500 | 8/1943 | Chace | 29—195.5 |
| 3,102,793 | 9/1963 | Alban | 29—195.5 |
| 3,563,712 | 2/1971 | Zeigler | 29—195.5 |

HYLAND BIZOT, Primary Examiner